United States Patent [19]

Kawai et al.

[11] Patent Number: 4,911,614

[45] Date of Patent: Mar. 27, 1990

[54] PISTON TYPE COMPRESSOR PROVIDED WITH VALVE ASSEMBLY STRUCTURE FOR REDUCING NOISE

[75] Inventors: Katsunori Kawai; Satoshi Umemura; Tatsuyuki Hoshino, all of Kariya, Japan

[73] Assignee: Kabushiki Kaisha Toyoda Jidoshokki Seisakusho, Aichi, Japan

[21] Appl. No.: 244,665

[22] Filed: Sep. 14, 1988

[30] Foreign Application Priority Data

Sep. 17, 1987 [JP] Japan ............................. 62-141876[U]

[51] Int. Cl.$^4$ ........................... F04B 1/16; F04B 21/02
[52] U.S. Cl. ................................... 417/269; 417/571; 137/514; 137/856
[58] Field of Search ............... 417/269, 563, 564, 567, 417/569, 571; 137/514, 855, 856, 857

[56] References Cited

U.S. PATENT DOCUMENTS 3,754,842 8/1973 Schlanzky ..................... 417/269
4,696,263 9/1987 Boyesen ....................... 137/855

FOREIGN PATENT DOCUMENTS 924310 4/1963 United Kingdom ............... 137/514

*Primary Examiner*—Leonard E. Smith
*Attorney, Agent, or Firm*—Burgess, Ryan and Wayne

[57] ABSTRACT

Noise is caused in a piston type compressor having a valve assembly including reed valves (13F, 14F) and a valve plate (10F) when the reed valves close and strike against the valve plate. The present invention provides a piston type compressor having a valve assembly including an elastic member (21F) and a thin valve sheet (20F) between the valve plate (10F) and the reed valves (14F), so that a shock caused by the reed valves striking the valve plate is absorbed, and the elastic member is protected by the thin valve sheet from damage usually caused by the striking thereof by the reed valves.

6 Claims, 5 Drawing Sheets

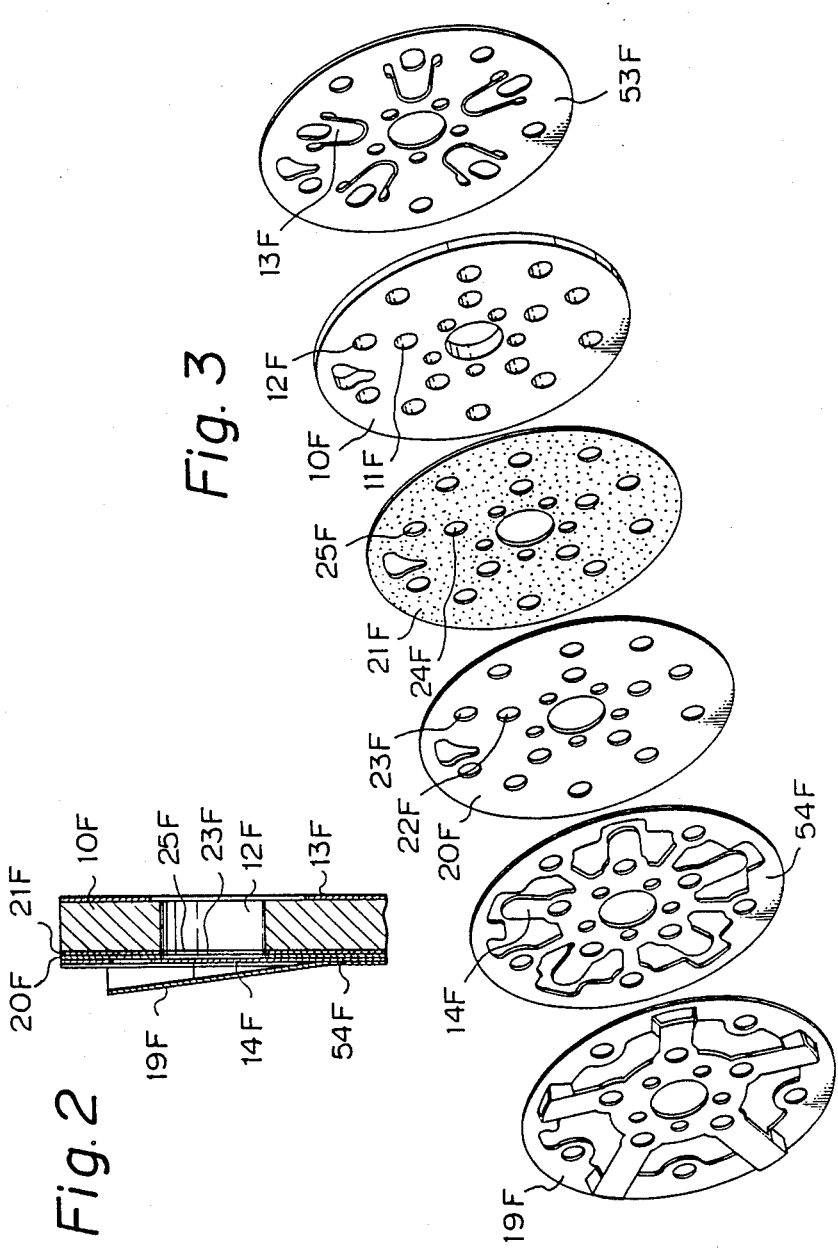

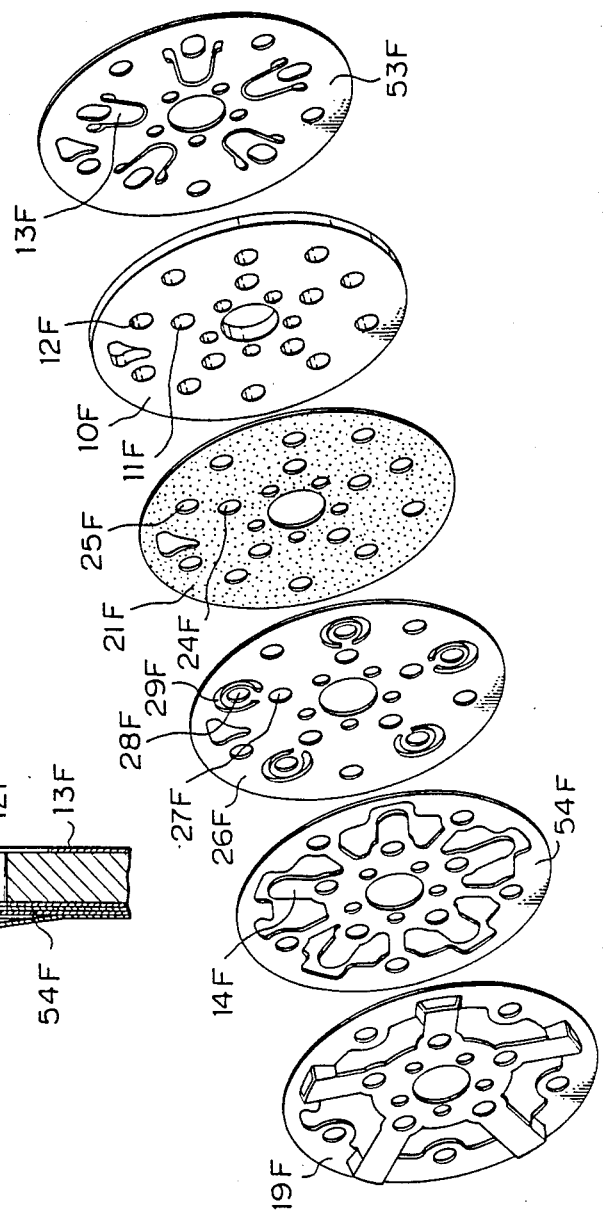
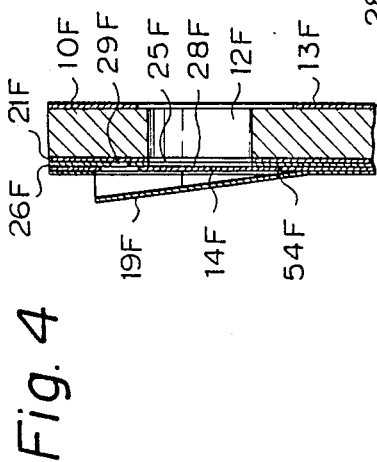

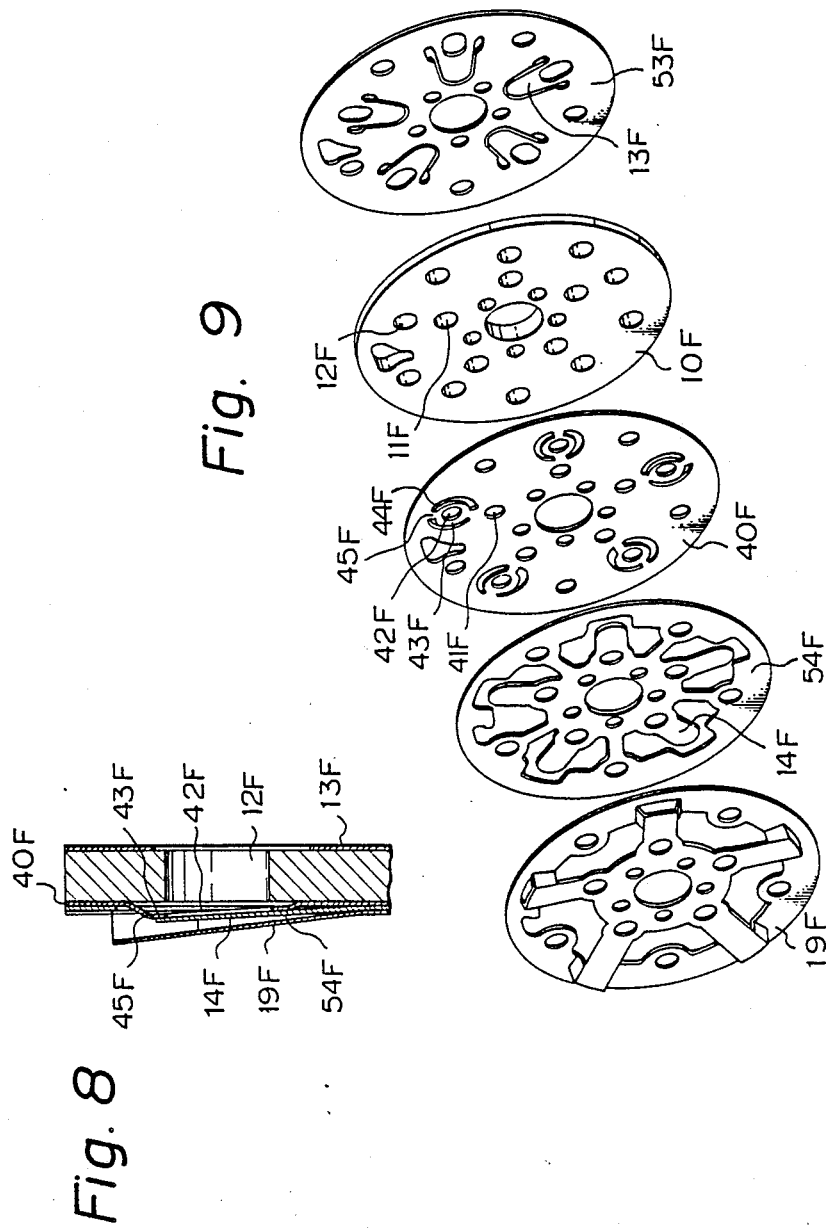

PISTON TYPE COMPRESSOR PROVIDED WITH VALVE ASSEMBLY STRUCTURE FOR REDUCING NOISE

BACKGROUND OF THE INVENTION

1. Field of the Invention

The present invention relates to a piston type compressor provided with a valve assembly for reducing noise, more particularly, to an improved piston type compressor wherein noise caused by a discharge or suction reed valve hitting a valve plate is reduced.

2. Description of the Related Art

A valve plate is generally disposed between each end face of a cylinder block and a front or rear housing in a piston type compressor such as a swash plate type or a wobble plate type compressor, and suction ports and discharge ports are formed in the valve plate corresponding to a suction chamber or a discharge chamber defined by the valve plate and the front or rear housing. A suction valve disk and a discharge valve disk are arranged respectively at each end face of the valve plate, these disks being provided with operable suction reed valves or operable discharge reed valves corresponding to the suction ports or the discharge ports.

Generally, a noise is caused when the valve plate made of metal is struck by the suction or discharge reed valves, or by a vibration of a valve assembly including the valve plate and the suction valve disk or the discharge valve disk. The following improvements are known as means for reducing such noise:

1: Forming a rubber coating on one end face of the valve plate corresponding to the suction valve disk or the discharge valve disk.

2: Forming a rubber coating on one end face of the suction valve disk or the discharge valve disk, facing the valve plate.

3: Mounting a rubber sheet, having substantially the same outward form as the valve plate, between the valve plate and the discharge valve disk.

4: Mounting a rubber sheet, having substantially the same outward form as the valve plate, between the valve plate and the suction valve disk.

In the above means, the impact energy when the valve plate is struck is absorbed by the rubber member, and thus the noise therefrom is reduced.

Nevertheless, the discharge reed valve or the suction reed valve strike the rubber member, and thus the rubber member is damaged or the layers constructing the member are exfoliated, and thus the reliability thereof is reduced.

Furthermore, a means for reducing a pressure generated in the elastic member (rubber member) when the valve is closed, i.e., reducing an opening area of the suction port or discharge port, or enlarging the size of the suction reed valve or discharge reed valve, has been disclosed in an attempt to solve the above-mentioned problem.

Another problem arises, however, in that the suction performance or discharge performance is reduced by an increase of the suction resistance or discharge resistance, and the suction temperature or discharge temperature is raised, when the former method is adopted. Further, another problem arises in that the energy loss becomes large during a suction or discharge process, due to an increase of a flexural rigidity of the suction reed valve or discharge reed valve, and the suction temperature r discharge temperature is raised, and this can lead to interference with other parts of the mechanism, when the latter method is adopted.

SUMMARY OF THE INVENTION

An object of the present invention is to provide a piston type compressor wherein damage or exfoliation of an elastic member thereof caused by a striking of the elastic member by the reed valves, is prevented, to thereby reduce noise in the mechanism.

Another object of the present invention is to provide a piston type compressor having a spring means which can not be damaged when struck by the reed valves, and which further reduces noise from the mechanism.

In accordance with one aspect of the present invention, there is provided a piston type compressor provided with a noise-reducing valve assembly, comprising: a cylinder block having a plurality of axial cylinder bores formed therein as compression chambers in which pistons are reciprocated to compress a refrigerant gas; at least a housing closing an axial end of said cylinder block and forming a suction chamber for receiving refrigerant gas to be compressed and a discharge chamber for receiving compressed refrigerant gas; a valve plate disposed between the cylinder block and the housing, and having suction ports for communicating between the suction chamber and the compression chambers, and discharge ports for communicating between the discharge chamber and the compression chambers; a suction valve disk arranged on one end face of the valve plate and having a plurality of suction reed valves able to be moved between a closed position for closing the suction ports and an open position for opening the suction ports; and a discharge valve disk arranged on the other end face of the valve plate and having a plurality of discharge reed valves able to be moved between a closed position or closing the discharge ports and an open position for opening the discharge ports, wherein the piston type compressor further comprises:

an elastic means arranged between the valve plate and at least one of the suction and discharge reed valves, for absorbing impact energy caused by the reed valves striking the valve plate when the reed valves are closed; and a valve sheet arranged between the elastic means and the reed valves, for preventing said reed valves from directly striking the elastic means, the valve sheet having bores corresponding to the suction and discharge ports and having a lower rigidity for a deflection thereof than that of the valve plate, and made of a hard material.

In the above-mentioned compressor, a shock caused by the reed valves striking the valve plate when the reed valves are closed by a suction or compression process of each piston, is absorbed by the elastic means and the valve sheet, which are deformable. Furthermore, the valve sheet prevents damage or exfoliation of the elastic means caused by the reed valves striking the elastic means directly, because the valve sheet is arranged between elastic means and the reed valves.

In accordance with another aspect of the present invention, instead of the above-mentioned elastic means and a valve sheet, a sheet-like spring means is provided between the valve plate and at least one of the suction and discharge valve disks, having bores corresponding to the suction and discharge ports and having elastic portions surrounding bores corresponding to at least one of the suction and discharge reed valves, the bores protruding from a surface of the sheet-like spring means.

In the compressor, although the elastic portions are struck by the reed valves, the elastic portions are not damaged or exfoliated like an elastic member, for example, a rubber plate, since the elastic portions are formed by a mechanical structure, instead of an elastic material as in the prior art, and thus noise is reduced.

BRIEF DESCRIPTION OF THE DRAWINGS

The above object, features and advantages of the present invention will become apparent from the following description of the embodiments illustrated in the accompanying drawings wherein:

FIG. 2 is an enlarged partial sectional view of a discharge port portion of the compressor shown in FIG. 1;

FIG. 3 is a perspective exploded view showing a valve assembly in FIG. 2;

FIG. 4 is an enlarged partial sectional view of a discharge port portion showing a second embodiment thereof;

FIG. 5 is a perspective exploded view showing a valve assembly in FIG. 4;

FIG. 8 is an enlarged partial sectional view of a discharge port portion showing a fourth embodiment thereof;

FIG. 9 is a perspective exploded view showing a valve assembly in FIG. 8.

DESCRIPTION OF THE PREFERRED EMBODIMENTS

The first embodiment of the present invention will be described hereinafter, using a swash plate type compressor shown in FIG. 1 as an example of a piston type compressor to which the present invention is related.

Figure 1:
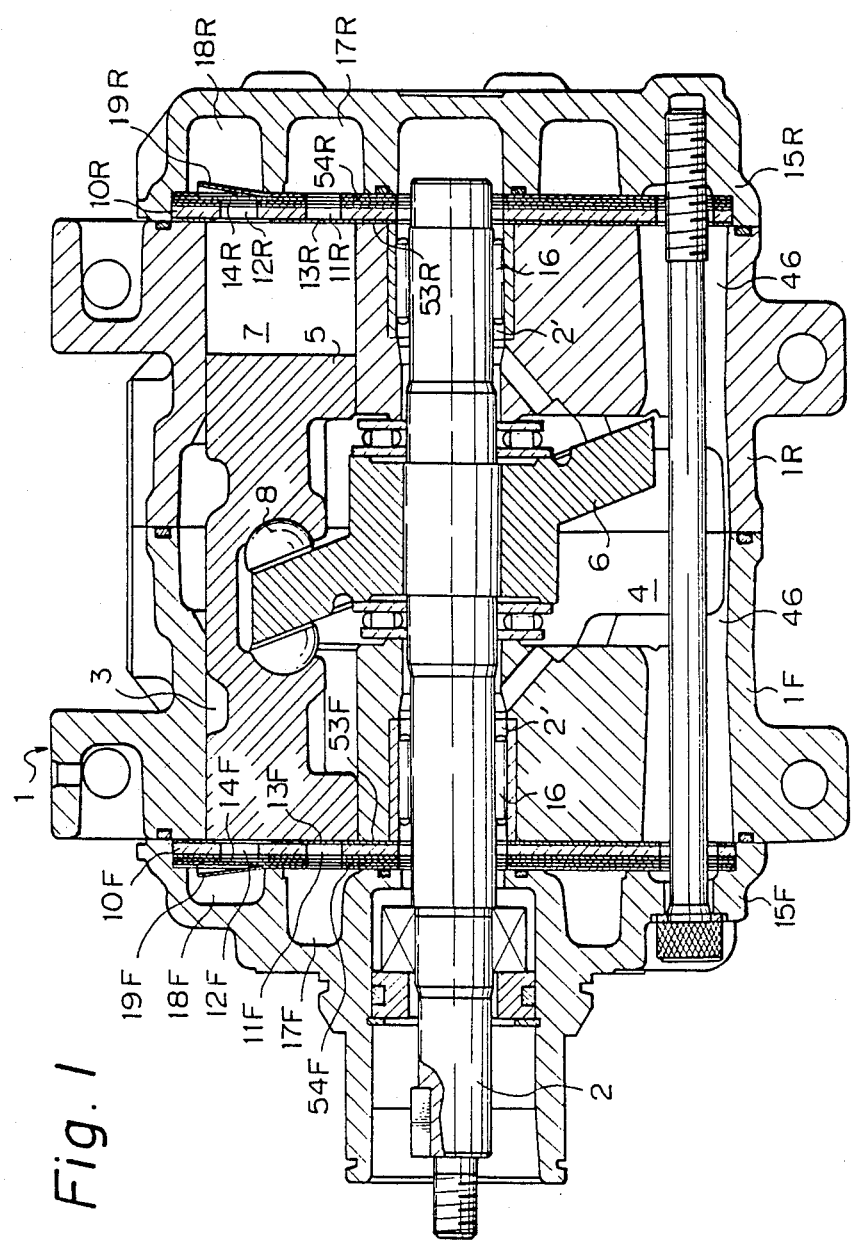
FIG. 1 is a longitudinal sectional view of a swash plate type compressor according to the present invention.

Referring to FIGS. 1, 2, and 3, a cylinder block 1 comprises a front cylinder block 1F and a rear cylinder block 1R, a bore 2' for a shaft 2 is formed through each cylinder block 1F, IR, and the shaft 2 is journaled rotatably by bearings 16 in each bore 2, One end of the shaft 2 is connected to a electromagnetic clutch (not shown) through a front housing 15F, and a drive force generated by an engine (not shown) is transmitted to the shaft 2 by the clutch. Several (five in the drawing) cylinder bores 3 are formed in an outer portion of the cylinder block 1, in parallel with the bore 2', i.e., are arranged at equispaced angular positions surrounding the bore 2'. Each cylinder bore 33 is arranged so as to form pairs, having a swash plate chamber 4 therebetween, disposed in the front cylinder block 1F and the rear cylinder block 1R. A reciprocal double-headed piston 5 is disposed in each pair of cylinder bores 3 forming a compression chamber 7 having a valve plate 10F or 10R as a top wall thereof. A swash plate 6 is fixed to the shaft 2 so that the swash plate 6 can rotate with the shaft 2, and therefore, the pistons 5 are reciprocated in the cylinder bores 3 by the rotation of the swash plate 6, through shoes 8 mounted between the swash plate 6 and each piston 5.

A front housing 15F covers a front open end of the cylinder block 1 holding a front valve plate 10F therebetween. The front housing 15F and the valve plate 10F define a front suction chamber 17F and a front discharge chamber 18F, wherein the chambers 17F and 18F are separated by an annular wall. In more detail, the suction chamber 17F is arranged in a circular form at an inner portion of the front housing 15F, and the discharge chamber 18F is arranged in a circular form at an outer portion surrounding the suction chamber 17F, and the suction chamber 17F and the discharge chamber 18F are communicated with each cylinder bore 3, i.e., to the compression chambers 5 through the suction ports 11F or discharge ports 12F formed in the front valve plate 10F.

A rear housing 15R covers a rear open end of he cylinder block 1 holding a rear valve plate 10R therebetween, and a rear suction chamber 17R, rear discharge chamber 18R, rear suction ports 11R, and rear discharge ports 12R are formed in the same arrangement as for the above front portion. The reference symbols F and R are attached to reference numbers denote front or rear portions hereinafter. On one side of the valve plate 10F or 10R facing the compression chamber 7, a suction valve disk 53F or 53R provided with openable suction reed valves 13F or 13R corresponding to the suction ports 11F or 11R is disposed and on the other side of each valve plate 10F or 10R, namely on the side facing the discharge chamber 18F or 18R, a discharge valve disk 54F or 54R provided with openable discharge reed valves 14F or 14R corresponding to the discharge ports 12F or 12R, is disposed. The suction reed valves 13F or 13R are opened at a start of a suction stroke of the pistons 5, from a closed position to an open position, and the discharge reed valves 14F or 14R are opened at a start of a discharge stroke of the pistons 5, from a closed position to an open position. A thin valve sheet 20F or 20R made of steel and a rubber sheet 21F or 21R are arranged between the discharge valve disks 54F or 54R and the valve plates 10F or 10R, and valve supporters 19F or 19R which define the closed position of the discharge reed valves 14F or 14R are arranged on the discharge valve disks 54F or 54R at the side thereof remote from the valve plates 10F or 10R. The valve sheets 20F or 20R are provided with bores 22F or 22R corresponding to the suction ports 11F or 11R, and other bores 23F or 23R corresponding to the discharge ports 12F or 12R. The rubber sheets 21F or 21R are provided with bores 24F or 24R corresponding to the suction ports 11F or 11R, and other bores 25F or 25R corresponding to the discharge ports 12F or 12R.

The rubber sheets 21F or 21R act as a shock absorber when the discharge reed valves 14F or 14R strike the valve plate 10F upon closing. The valve sheets 20F or 20R have a lower flexural rigidity than that of the valve plate 10F, and are disposed between the rubber sheets 21F or 21R and the discharge valve disks 54F or 54R. Therefore, the valve sheets 20F or 20R protect the rubber sheets 21F or 21R, by deflecting in accordance with a deformation of the rubber sheet.

A rubber layer coated on a side of the valve sheets 20F or 20R remote from the discharge valve disks 54F or 54R, or another rubber layer coated on a side of the valve plates 10F or 10R near to the discharge valve disks 54F or 54R, may be substituted for the separate rubber sheet member 1F (or 21R) shown in FIG. 3.

A second embodiment of a valve assembly comprising the valve supporter, the discharge valve disk, the valve sheet, the rubber sheet, the valve plate, and the suction valve dis is shown in FIGS. 4 and 5. In the second embodiment, only a vale sheet 26F (or 26R) differs from that shown n FIG. 3. The valve sheet 26F or 26R is substantially the same size as the valve plates 10F or 10R, as were the valve sheets 20F or 20R. Bores 27F or 27R corresponding to the suction ports 11F or 11R, and other bores 28F or 28R corresponding to the discharge ports 12F or 12R are formed in the valve sheets 26F or 26R, as for the valve sheets 20F or 20R, and C-shaped slits 29F or 29R are formed around the bores 28F or 28R in the valve sheets 26F or 26R. Therefore, the stiffness of the valve sheet 26F or 26R, especially the stiffness of an area around each bore 28F or 28R, is reduced.

Figure 6:
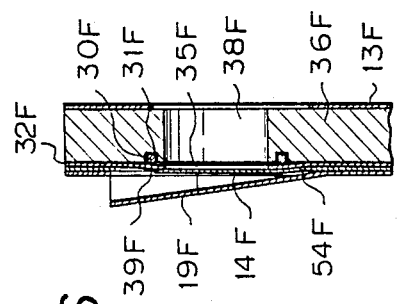
FIG. 6 is an enlarged partial sectional view of a discharge port portion showing a third embodiment thereof.
Figure 7:
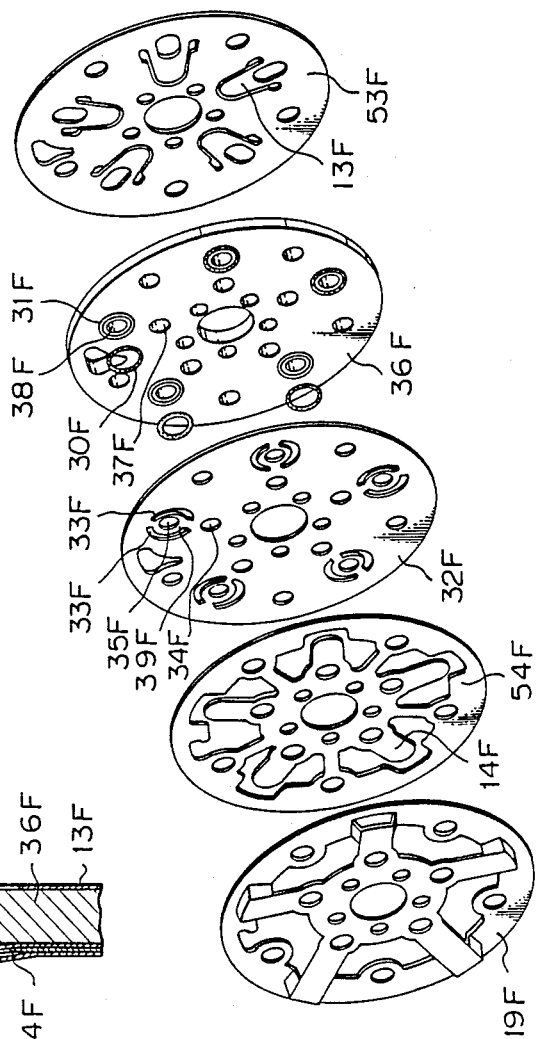
FIG. 7 is a perspective exploded view showing a valve assembly in FIG. 6.

A third embodiment of a valve assembly is shown in FIGS. 6 and 7. In the third embodiment, valve sheets 32F or 32R, valve plates 36F or 36R, and elastic 0-rings 30F or 30R are used instead of the valve sheets 20F or 20R, the valve plates 10F or 10R, and the rubber sheets 21F or 21R in the first embodiment. Suction ports 37F or 37R corresponding to the suction ports 11F or 11R, and discharge ports 38F or 38R corresponding to the discharge ports 12F or 12R are formed in the valve plate 36F or 36R, and a circular groove 31F or 31R is formed surrounding each discharge port 38F or 38R on the face of the valve plates 36F or 36R, facing the valve sheets 32F or 32R, and elastic 0-rings 30F or 30R are seated in the circular grooves 31F or 31R. The valve sheets 32F or 32R are provided with bores 34F or 34R corresponding to the suction ports 37F or 37R, and other bores 35F or 35R corresponding to the discharge ports 38F or 38R. Two slits 33F or 33R are formed around the bores 35F or 35R to provide annular portions 39F or 39R for the abutment of the elastic 0-rings 30F or 30R thereupon. The same thin valve sheet as that of the first embodiment may be used also in the third embodiment. However the annular portions 39F or 39R defined by two slits 33F or 33R would give a greater flexibility thereto.

A fourth embodiment of a valve assembly is shown in FIGS. 8 and 9. In this embodiment, sheet-like spring plates 40F or 40R are used instead of the valve sheets 20F or 20R and the rubber sheets 21F or 21R in tee first embodiment. The plates 40F or 40R are made of, for example, steel, as in the other embodiments, and are provided with bores 41F or 41R corresponding to the suction ports 11F or 11R, and other bores 42F or 42R corresponding to the discharge ports 12F or 12R. Two slits 44F or 44R are formed around the bores 42F or 42R to provide annular portions 43F or 43R connected by two short band portions 45F or 45R. The annular portions 43F or 43R protrude slightly from a surface of the plates 40F or 40R toward the discharge valve disks 54F or 54R by short band portions 45F or 45R. The sheet-like spring plates 40F or 40R made of steel are formed by pressing, as in the other embodiments. The annular portions 43F or 43R act as springs due to the existence of the short band portions 45F or 45R when the discharge reed valves 14F or 14R close and strike against the annular portions 43F or 43R.

The operation of the swash plate type compressor of the first embodiment shown in FIGS. 1, 2, and 3 will now be described drive force of an engine (not shown) is transmitted to the shaft 2 via an electromagnetic clutch (not shown) so that the swash plate 6 is swingingly rotated in the swash plate chamber 4, and consequently, the pistons 5 are sequentially reciprocated in the cylinder bores 3, by the shoes 8 mounted between the pistons 5 and the swash plate 6.

A refrigerant gas is fed to the swash plate chamber 4 from an outer circuit (not shown), and the refrigerant gas in the chamber 4 is subsequently fed to the suction chambers 17F and 17R through a channel 46. A negative pressure generated in the compression chambers 7 during a suction stroke of the pistons 5 causes the suction reed valves 13F or 13R to open so that the refrigerant gas in the suction chambers 17F or 17R is sucked into the compression chambers 7. The refrigerant gas in the compression chambers 7 is compressed by the pistons 5 during a compression stroke (a discharge stroke), causing the discharge reed valves 14F or 14R to open and feed the compressed refrigerant gas to the discharge chambers 18 or 18R.

When, for example, the discharge reed valves 14F or 14R are close by the reciprocal motion of the piston 5, they are closed by an equilibrium among a differential pressure force in a pressure in the compression chamber and a pressure in the discharge chamber, multiplied by the opening areas of the discharge ports 12F or 12R, a force due to a bending stiffness thereof, and an inertial resistance thereof.

The total force of the differential pressure force and the force due to the bending stiffness causes the discharge reed valves 14F or 14R to strike the valve plates 10F or 10R through the valve sheets 20F or 20R and the rubber sheets 21F or 11R and close the discharge ports 12F or 12R. The shock of the above-mentioned strike is absorbed by the wide valve sheets 20F or 20R and the rubber sheets 21F or 21R due to the flexibility thereof, because the valve sheets 20F or 20R are thin and the rubber sheets 21F or 21R are made of an elastic material, i.e., a rubber. Furthermore, damage to the rubber sheets 21F or 21R is prevented by the valve plates made of a steel, which is a hard material. Consequently, noise due to the strike is reduced, and the rubber sheets 21F or 21R are protected from damage.

Although the above description included the structure of a valve assembly for reducing noise from the discharge reed valves 14F or 14R in the above embodiments, this valve assembly structure can be used for the suction reed valves 13F or 13R. Moreover, the above structure of a valve assembly also can be used with a different type of piston compressor, such as a wobble plate type, a disk cam type, and the like.

In a piston type compressor having a valve assembly structure according to the present invention, noise is reduced and thus the reliability of the valve assembly is increased, because a wide valve sheet and elastic means are arranged between the reed valves and the valve plate, and the elastic means, which usually are easily suffer damaged or exfoliated, are protected by the wide flexible valve sheet made of a hard material and provided between the elastic means and the reed valves.

A similar effect whereby noise is reduced and the reliability of a valve assembly is increased in a piston type compressor is obtained with a valve assembly having a sheet-like spring plate, because an elastic portion thereof is formed mechanically and a material that is easily damaged is not used.

We claim:

1. A piston type compressor provided with a valve assembly structure for reducing noise, comprising:
 a cylinder block having a plurality of axial cylinder bores formed therein as compression chambers and having pistons reciprocated therein for compressing a refrigerant gas;

a least a housing closing an axial end of said cylinder block and forming a suction chamber for receiving a refrigerant gas to be compressed and a discharge chamber for receiving a compressed refrigerant gas;

a valve plate provided between said cylinder block and said housing, and having suction ports for communicating between said suction chamber and said compression chambers, and discharge ports for communicating between said discharge chamber and said compression chambers;

a suction valve disk arranged on one end face of said valve plate and having a plurality of suction reed valves able to move between a closed position for closing said suction ports and an open position for opening said suction ports; and a discharge valve disk arranged on the other end face of said valve plate and having a plurality of discharge reed valves able to move between a closed position for closing said discharge ports and an open position for opening said discharge ports, wherein said piston type compressor further comprises:

an elastic plate member having bores corresponding to the suction ports and the discharge ports provided between said valve plate and at least one of said suction and discharge reed valves, for absorbing a shock caused by striking said valve plate when said reed valves close; and a valve sheet arranged between said elastic means and said one of said reed valves, for preventing said elastic means from being struck directly by said one of said reed valves, said valve sheet having bores corresponding to said suction and discharge ports and having a lower rigidity for a deflection thereof than that of said valve plate, and made of a hard material and having slits in area around bores corresponding to at least one of said suction and discharge reed valves.

2. A piston type compressor provided with a valve assembly structure for reducing noise, comprising:

a cylinder block having a plurality of axial cylinder bores formed therein as compression chambers and having pistons reciprocated therein for compressing a refrigerant gas;

at least a housing closing an axial end of said cylinder block and forming a suction chamber for receiving a refrigerant gas to be compressed and a discharge chamber for receiving a compressed refrigerant gas;

a valve plate provided between said cylinder block and said housing, and having suction ports for communicating between said suction chamber and said compression chambers, and discharge ports for communicating between said discharge chamber and said compression chambers;

a suction valve disk arranged on one end face of said valve plate and having a plurality of suction reed valves able to move between a closed position for closing said suction ports and an open position for opening said suction ports; and a discharge valve disk arranged on the other end face of said valve plate and having a plurality of discharge reed valves able to move between a closed position for closing said discharge ports and an open position for opening said discharge ports, wherein said piston type compressor further comprises:

an elastic means comprising an elastic coating member coated on one end face of valve sheet facing said valve plate for absorbing a shock caused by striking said valve plate when said reed valves close; and the valve sheet arranged between said elastic means and said one of said reed valves, for preventing said elastic means from being struck directly by said one of said reed valves, said valve sheet having bores correspondingly to said suction and discharge ports and having a lower rigidity for a deflection thereof than that of said valve plate, and made of a hard material and having slits in areas around bores corresponding to at least one of said suction and discharge reed valves.

3. A piston type compressor provided with a valve assembly structure for reducing noise, comprising:

a cylinder block having a plurality of axial cylinder bores formed therein as compression chambers and having pistons reciprocated therein for compressing a refrigerant gas;

at least a housing closing an axial end of said cylinder block and forming a suction chamber for receiving a refrigerant gas to be compressed and a discharge chamber for receiving a compressed refrigerant gas;

a valve plate provided between said cylinder block and said housing, and having suction ports for communicating between said suction chamber and said compression chambers, and discharge ports for communicating between said discharge chamber and said compression chambers;

a suction valve disk arranged on one end face of said valve plate and having a plurality of suction reed valves able to move between a closed position for closing said suction ports and an open position for opening said suction ports; and a discharge valve disk arranged on the other end face of said valve plate and having a plurality of discharge reed valves able to move between a closed position for closing said discharge ports and an open position for opening said discharge ports, wherein said piston type compressor further comprises:

an elastic means comprising an elastic member coated on one end face of said valve plate facing a valve sheet, for absorbing a shock caused by striking said valve plate when said reed valves close; and the valve sheet arranged between said elastic means and said one of said reed valves, for preventing said elastic means from being struck directly by said one of said reed valves, said valve sheet having bores corresponding to said suction and discharge ports and having a lower rigidity for a deflection thereof than that of said valve plate, and made of a hard material and having slits in areas around bores corresponding to at least one of said suction and discharge reed valves.

4. A piston type compressor provided with a valve assembly structure for reducing noise, comprising:

a cylinder block having a plurality of axial cylinder bores formed therein as compression chambers and having pistons reciprocated therein for compressing a refrigerant gas;

at least a housing closing an axial end of said cylinder block and forming a suction chamber for receiving a refrigerant gas to be compressed and a discharge chamber for receiving a compressed refrigerant gas;

a valve plate provided between said cylinder block and said housing, and having suction ports for communicating between said suction chamber and said compression chambers, and discharge ports for communicating between said discharge chamber and said compression chambers;

a suction valve disk arranged on one end face of said valve plate and having a plurality of suction reed valves able to move between a closed position for closing said suction ports and an open position for opening said suction ports; and a discharge valve disk arranged on the other end face of said valve plate and having a plurality of discharge reed valves able to move between a closed position for closing said discharge ports and an open position for opening said discharge ports, wherein said piston type compressor further comprises:

an elastic means comprising O-rings each of which surrounds each bore of at least one of said suction and discharge ports provided between said valve plate and at least one of said suction and discharge reed valves, for absorbing a shock caused by striking said valve plate when said reed valves close; and a valve sheet arranged between said elastic means and said one of said reed valves, for preventing said elastic means from being struck directly by said one of said reed valves, said valve sheet having bores corresponding to said suction and discharge ports and having a lower rigidity for a deflection thereof than that of said valve plate, and made of a hard material and having slits in areas around bores corresponding to at least one of said suction and discharge reed valves, to thereby make said areas of said valve sheet more deformable.

5. A piston type compressor provided with a valve assembly structure for reducing noise, comprising:

a cylinder block having a plurality of axial cylinder bores formed therein as compression chambers and having pistons reciprocating therein to compress a refrigerant gas;

at least a housing closing an axial end of said cylinder block and forming a suction chamber for receiving a refrigerant gas to be compressed and a discharge chamber for receiving a compressed refrigerant gas;

a valve plate provided between said cylinder block and said housing, and having suction ports for communicating between said suction chamber and said compression chambers, and discharge ports for communicating between said discharge chamber and said compression chambers;

a suction valve disk arranged on one end face of said valve plate and having a plurality of suction reed valves able to move between a closed position for closing said suction ports and an open position for opening said suction ports; and a discharge valve disk arranged on the other end face of said valve plate and having a plurality of discharge reed valves able to move between a closed position for closing said discharge ports and an open position for opening said discharge ports, wherein said piston type compressor further comprises:

a sheet-like spring means arranged between said valve plate and at least one of said suction and discharge valve disks, and having bores corresponding to said suction and discharge ports and elastic portions surrounding bores corresponding to at least one of said suction and discharge reed valves, said bores surrounded by said elastic portions protruding from a surface of said sheet-like spring means.

6. A piston type compressor provided with a valve assembly structure for reducing noise according to claim 5, wherein each of said elastic portions has slit(s).

* * * * *